J. STRAKA.
DETACHABLE CLIP FOR MEASURING DEVICES.
APPLICATION FILED MAR. 14, 1919.
1,406,774.
Patented Feb. 14, 1922.
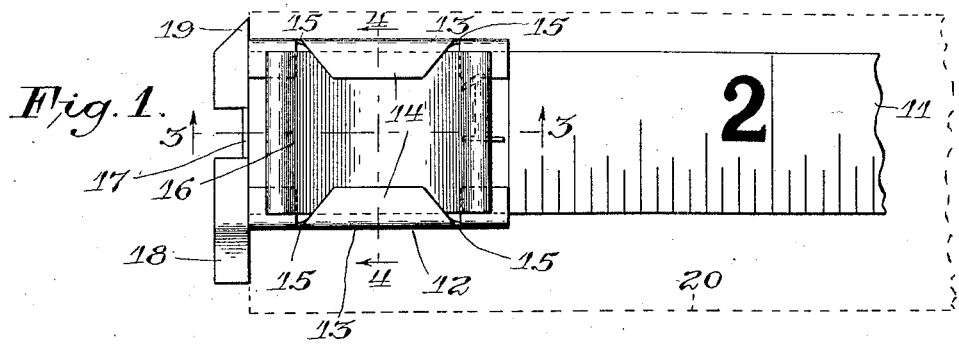
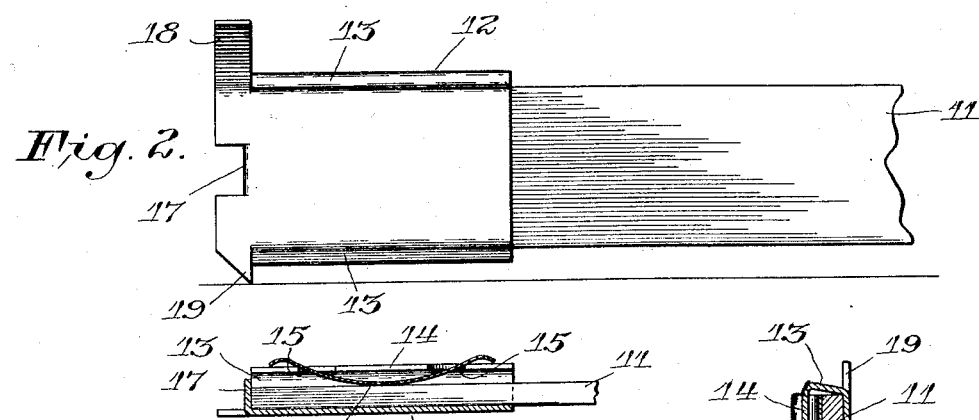
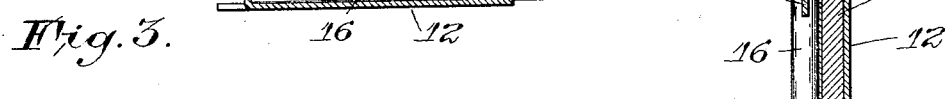
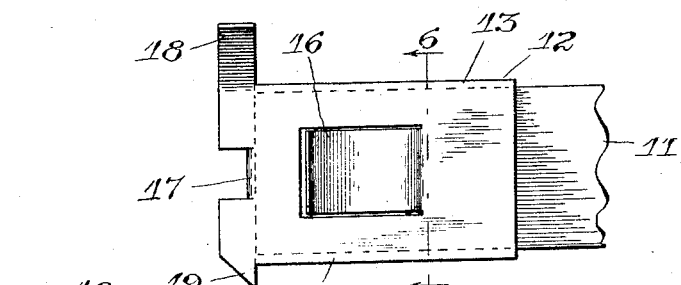
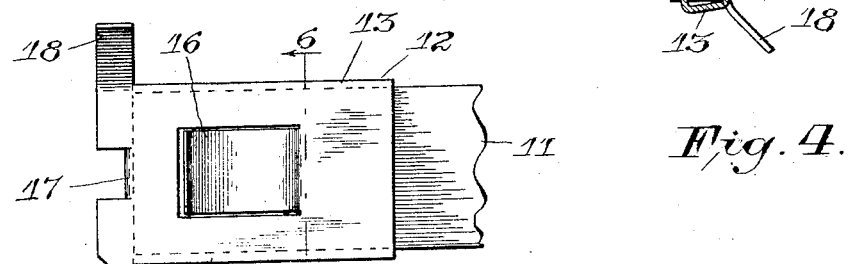
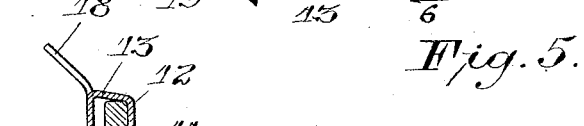
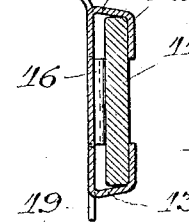
Inventor.
Jaroslav Straka,
By John P. Smith
Atty.

UNITED STATES PATENT OFFICE.

JAROSLAV STRAKA, OF CHICAGO, ILLINOIS.

DETACHABLE CLIP FOR MEASURING DEVICES.

1,406,774.  Specification of Letters Patent.  Patented Feb. 14, 1922.

Application filed March 14, 1919. Serial No. 282,702.

*To all whom it may concern:*

Be it known that I, JAROSLAV STRAKA, a citizen of the United States, residing at Chicago, in the county of Cook and State of Illinois, have invented certain new and useful Improvements in Detachable Clips for Measuring Devices, of which the following is a full, clear, and exact specification.

The present invention relates in general to measuring instruments, and more particularly to a device that can be readily attached to the end of a measuring instrument or rule for the purpose of permitting the same to be temporarily connected to the end of the material being measured in such a position that the end of the rule is aligned with the end of the material.

A further object is to provide a device that can be quickly attached to or detached from any measuring instrument.

A further object is to provide a device for marking off or indicating the end of the measuring instrument on the material being measured.

In the accompanying drawing illustrating my invention—

Figure 1 is a plan view of a part of a rule provided with my improved detachable clip;

Fig. 2 is a rear view of the device showing the marker being employed;

Fig. 3 is a detail sectional view of Fig. 1 taken on the line 3—3 showing the longitudinal position of the resilient member;

Fig. 4 is a detail sectional view of Fig. 1 taken on the line 4—4;

Fig. 5 is a modification of the construction shown in Fig. 1 with the spring formed integral with body portion of the detachable clip; and Fig. 6 is a detail sectional view of the modified form shown in Fig. 5 taken on the line 6—6.

Similar characters of reference designate corresponding parts throughout the different figures of the drawings.

The ordinary graduated rule 11 is shown here merely by way of example, but without any idea of restricting the invention thereto as the latter is adaptable for any kind of a measuring instrument.

My improved detachable clip 12 consists primarily of thin metallic plate formed with upstanding and outwardly inclined sides 13, and having formed integrally therewith overhanging portions 14 which are suitably notched at 15 for the reception of the resilient member 16. This construction forms a rectangular socket into which the rule 11 is inserted against the pressure of the resilient member 16 until the end of said rule contacts with the upstanding portion or stop 17. This brings the end of the rule 11 into alignment with the right edge (see Fig. 1) of the downwardly projecting lug 18 and marker 19, as is shown in Fig. 1.

The operation and use of my device will be clearly understood from the foregoing description. If we assume that the material or article 20 is to be measured, the rule 11 with the detachable clip 12 is laid down flat on the material 20, with the downwardly projecting lug 18 brought into contact with the edge of said material, thus bringing the end of the measuring instrument in line with the edge of the material 20.

The device may be used for marking off material by means of the marking finger 19, which is illustrated in Fig. 2 and will need no further explanation.

In my modified construction in Fig. 5, I have made the clip of resilient material with the spring member formed integrally with the body portion 12, thus forming the complete clip out of one piece of material.

It is obvious that changes in details of construction may be made without departing from the spirit of my invention, and I do not wish to confine myself to any particular form or construction.

What I claim as my invention is:

1. A rule in combination with a detachable clip having a lug, an edge of said lug being aligned with said rule and in a plane at an angle oblique to the plane of said rule.

2. A detachable clip comprising a flat body-portion having upwardly and outwardly inclined sides and overhanging edges formed integrally therewith, said edges suitably notched for the reception of a resilient member.

3. A clip adapted to be detachably fastened to a measuring device, and having a lug, a marker, and a stop for aligning one edge of said measuring device with said lug and marker.

4. A clip adapted to be detachably fastened to a measuring device, having an oppositely disposed lug and marker and means for aligning said lug and marker with one edge of said measuring device.

In testimony whereof I affix my signature.

JAROSLAV STRAKA.